United States Patent
Mogilevsky et al.

(10) Patent No.: US 7,500,250 B2
(45) Date of Patent: Mar. 3, 2009

(54) CONFIGURABLE EVENT HANDLING FOR USER INTERFACE COMPONENTS

(75) Inventors: Alex Mogilevsky, Bellevue, WA (US); Mark Harper, Redmond, WA (US); Mikhail Y. Arkhipov, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 992 days.

(21) Appl. No.: 10/400,366

(22) Filed: Mar. 27, 2003

(65) Prior Publication Data

US 2004/0194115 A1    Sep. 30, 2004

(51) Int. Cl.
    *G06F 13/00* (2006.01)
(52) U.S. Cl. ............................ 719/318; 711/100
(58) Field of Classification Search .............. 719/318; 711/100
    See application file for complete search history.

(56) References Cited

U.S. PATENT DOCUMENTS

| | | | |
|---|---|---|---|
| 5,625,821 A * | 4/1997 | Record et al. ............... | 718/100 |
| 5,694,610 A | 12/1997 | Habib et al. ................ | 395/793 |
| 6,035,343 A * | 3/2000 | Tsushima et al. ........... | 719/318 |
| 6,208,337 B1 | 3/2001 | Zimmerman et al. ........ | 345/335 |
| 6,288,720 B1 | 9/2001 | Zimmerman et al. ........ | 345/352 |
| 6,304,258 B1 | 10/2001 | Zimmerman et al. ........ | 345/346 |
| 6,389,447 B1 * | 5/2002 | Singh ......................... | 718/100 |
| 6,417,872 B2 | 7/2002 | Zimmerman et al. ........ | 345/777 |
| 6,633,313 B1 * | 10/2003 | Cirne et al. ................. | 715/744 |
| 6,691,175 B1 * | 2/2004 | Lodrige et al. .............. | 719/314 |
| 6,701,513 B1 * | 3/2004 | Bailey ......................... | 717/109 |
| 6,760,783 B1 * | 7/2004 | Berry ......................... | 719/318 |
| 6,996,925 B2 * | 2/2006 | Harding ........................ | 37/405 |
| 7,082,599 B1 * | 7/2006 | Morganelli et al. ......... | 717/132 |
| 2002/0188822 A1 * | 12/2002 | Edwards et al. ................ | 712/1 |
| 2003/0018702 A1 * | 1/2003 | Broughton et al. .......... | 709/202 |
| 2004/0024969 A1 * | 2/2004 | Chauvel et al. .............. | 711/132 |

OTHER PUBLICATIONS

Coutaz-Raymond, J. et al., "ADELE and the Compositor-Mediator or How to make an Interactive Applications Program Independent of the User Interface", *Software Engineering: Practice and Experience*, Jun. 1984, 78-86.

Shneiderman, B. et al., "Display Strategies for Program Browsing: Concepts and Experiment", *IEEE Software*, 1986, 3(3), 7-15.

Yip, S.W.L. et al., "Graphical User Interfaces Validation: A Problem Analysis and a Strategy to Solution", *Proc. of the 24th Annual Hawaii Intl. Conference*, 1991, 2, 91-100.

* cited by examiner

*Primary Examiner*—Andy Ho
(74) *Attorney, Agent, or Firm*—Woodcock Washburn LLP (57) ABSTRACT

A user interface event is received by way of a user interface. A software component adapted to process the user interface event may be pushed onto a memory stack, and the user interface event may be processed using the software component on the stack, or with a software component that is not on the stack. The software component on the stack, if used, may then be popped from the memory stack. In addition, a plurality of software components may be pushed onto the memory stack, and in that case, at least one of the components may be selected to process the user interface event. The user interface event is processed using at least one of the plurality of software components, and one or more of the plurality of software components are popped from the memory stack.

56 Claims, 6 Drawing Sheets

CONFIGURABLE EVENT HANDLING FOR USER INTERFACE COMPONENTS

FIELD OF THE INVENTION

The present invention relates to computer user interfaces. More particularly, the present invention relates to a configurable method and system for handling user input events that take place in an interactive design environment. Even more particularly, the present invention relates to using a memory stack to implement software components that handle user input events in such a design environment.

BACKGROUND OF THE INVENTION

In computing environments, a user interface (UI) typically allows a user to interact with objects displayed on a display device by using an input device. For example, a user may use a mouse to direct selection indicia, such as a pointer, to an object on a monitor screen, and then may "click" on the object to select the object or to perform a function on the object. Such a function is typically defined and controlled by the software that is generating the particular UI, or by software that is running transparently to generate the functionality while other software generates the UI. Sometimes a function that may be performed by the user is defined by the area that is selected, or by the area over which the pointer is placed prior to selection. In other instances, the functions that may be performed are contextual, where a function is made available to a user based on what task is being performed, or by the component of the software that is currently being used. In still other instances, a combination of context and user selection determines an available function.

A computer user may use the same pointer to perform a multitude of tasks. For example, a pointer may enable a default function, such as the ability to select objects on a display device, but when the pointer is placed on the edge of an object it may offer a different function, such as a resizing function. When the user moves the pointer off the edge, the pointer may then revert to its default function. As a more detailed example, a user may direct a selection pointer to an object and then may select the object. In many computer systems, such a selection may be accomplished by moving a mouse to position the pointer over the desired object, and then by pressing a button on the mouse ("mouse down") to select the object. Now that the object has been selected, the software may associate this UI event—where the user has placed the pointer over an object and then pressed a button—with a desire to move the object to another location. Such an association is typically referred to as a component—where a UI event defines a function that the software will perform. Accordingly, the software may enable a relocation function, where the user may move the mouse while holding down the button to move the object to another location on the display device. Upon reaching the desired location, the user may release the button ("mouse up") to fix the object to its new location. Upon completing the movement, the pointer may revert to being a selection pointer, or it may allow the user to perform another function.

As discussed above, the functions performed by the software are typically activated by events initiated by components, such as a component associated with the aforementioned combination of a mouse movement and button click. Correspondingly, for a given component, user actions typically have a fixed meaning. Therefore, a combination of a component and a UI event can be associated with a "handler," which is a piece of software code activated by the event. The handler contains computer-readable instructions enabling the computer to carry out the necessary functionality.

In addition to a UI event, and as discussed briefly above, the context in which the UI event occurs may affect which software function is performed, and which handler is activated. For example, in a design environment, such as an editing mode for permitting user interaction with an electronic document, the meaning of a given UI event may vary greatly. The meaning may depend on a particular editing mode in which the software is currently operating, the editing operation currently being performed, the software tool that is currently active, and the like. For example, in a software application having a graphical image of a button on a display device, such as a "print" button in a word processor, the UI event of a mouse click on the button could mean different things depending on the context in which the UI event takes place. For example, it could mean the selection of the button to cause a document to print, the start of a movement of the selected button to another location on the display device, or the activation of text editing in the button's label. In each case, the software may be operating in a different editing mode, such as a general document editing mode, a button relocation mode or a button editing mode, respectively.

Because of the variety of editing operations that may be performed for a given UI event, therefore, UI event processing in an editing environment cannot be tied to particular components. Instead, UI event processing should be handled by a special editing framework. In conventional systems, such a framework involves a systematic means for keeping track of the particular state in which a program is operating. Using the object relocation example given above, a state machine or the like typically performs such a function.

For example, the software in the above example may be operating in a general editing state, in which the default function for the pointer is as a selection pointer. While the pointer is positioned over empty space, or where the pointer is not positioned over any object with which the pointer can interact, a mouse down will not have any effect. Once the pointer is positioned over an object with which it can interact, the state changes to a second state where a mouse down will select the object. However, the user may then reposition the mouse over empty space where the state will revert to the general editing state. Alternatively, the user may mouse down on the object, whereby the state again changes to a third state where a movement of the mouse will move the object. Once a mouse up occurs, the state changes again. In this case, the pointer is likely still over the object, so the state will likely revert to the second state. Another possibility is that the state will change to a fourth state, where another function is available to the user. In addition, given the same set of UI events, if the user is in a different editing mode, any or all of the states may be different, because a different editing mode may, as discussed above, have different functionality for a given UI event.

A state machine in such a conventional system keeps track of all the possible previous and next states in which the software may operate. As in the above example, when in the general editing state, the state machine would permit a user to enter into the second state when the user positions the pointer over an object with which it can interact. Once in the second state, the state machine would permit the user to revert to the previous general editing state, which could occur if the user repositioned the pointer over empty space. Alternatively, the state machine could permit the user to enter the third state, which could occur if the user moused down on the object. There may be a plurality of states into which the user may enter at any point. For example, while in the second state, the user may be able to enter any one of several states—such as a third, fourth, fifth or sixth state—depending on the UI event initiated by the user.

In a conventional system, the state machine may also be comprised of several modules. For example, a first module may keep track of the states as mentioned above. A second module may invoke the necessary handler to perform the function requested by the UI event, and a third module may handle communications and other functions between the first and second module. In the example discussed above, for example, when the user mouses down on the object while in the second state, the first module would note that the user is now in the third state. The second module would invoke the necessary handler(s) to perform the move function, such as a graphics module. The third module would carry out communications between the first and second modules, such as signaling the first module when the handler invoked by the second module has completed its task.

A particularly problematic arrangement occurs in editing environments that involve different types of editable objects, such as mixed text, graphics and installed objects, which results in heterogeneous selection events. Managing a user selection in such an environment is a challenge both in terms of state management and control of multiple software components, each of which are invoked by the same input events. For example, a mouse down may have a certain effect when the selected object is text, and a different effect when the selected object is graphics, a hyperlink or the like, even though the actual UI event—a mouse down—is identical in either case.

As may be appreciated, therefore, any software having a rich set of functionality will have a large and complex arrangement of possible states. In addition, the states must be accounted for with perfect accuracy, otherwise inconsistent results or program failure may occur. For example, if the states are not kept perfectly consistent, the same UI event in the same editing mode may yield a different software operation for a given UI event, or may cause the program to crash by causing the state machine to enter into an inconsistent or unplanned-for state. Using the module system discussed above to provide an example of an inconsistent state, the third module may report to the first module that a certain handler has completed its task as invoked by the second module, but the identity of the handler may not correspond to a proper handler for the state in which the first module is currently operating. In such a case, there may be no instructions for the first module to determine the state to which it should proceed.

In many applications, a user such as a programmer or system administrator may wish to customize the software to add functionality to a program that was not originally part of such program. For example, a user with specific requirements may wish to provide an added or different function from the default function when a pointer is moved to an object. Accommodating such a customization adds a requirement to the software to enable UI event handling to be customizable, so that custom tools can be integrated into the software.

A shortcoming of conventional software is that incorporating such added functionality into the software can be extremely difficult and complex. For example, in the software discussed above, a user wishing to modify the software would need perfect knowledge of each state used by the software, so a new function could be added without causing an illegal function or software crash. If the software has rich functionality, as discussed above, the complexity of the accounting for each of the existing states may cause such a modification to be unduly difficult. In fact, the task is so complicated in conventional software that in most situations, a programmer wishing to customize such conventional software will simply replace the entire UI event handling system rather than attempting to incorporate a new function. Such a replacement is an unnecessarily drastic procedure, particularly when the amount of desired customization is relatively small.

What is needed is a method for providing a framework for extensible UI event handling in a software application. More particularly, what is needed is a method for enabling a UI event handling system to be customized with custom tools, custom types of editable objects, and the like. Furthermore, what is needed is such a method that also adds a mechanism for modification of existing editing tools without the need to completely replace the entire UI event handling system. Even more particularly, what is needed is such a method that further takes advantage of customizable UI event handling to provide an extensible selection mode, where custom component types may participate in selection and editing of an electronic document.

SUMMARY OF THE INVENTION

In view of the foregoing, the present invention provides a method and system for processing a user interface event. The user interface event may take place in any environment of a software application, and may result from any type of user or software action. The present invention also provides a framework for customizing the processing of a user interface event without the necessity of maintaining accountability of computer states. The present invention further provides a framework for event handling and routing that also enables simple and flexible management of heterogeneous selection, including installable selection types.

In the method, a user interface event is received by way of a user interface. A software component adapted to process the user interface event may be pushed onto a memory stack, and the user interface event may be processed using the software component on the stack, or with a software component that is not on the stack. The software component on the stack, if used, may then be popped from the memory stack. In addition, a plurality of software components may be pushed onto the memory stack, and in that case, at least one of the components may be selected to process the user interface event. The user interface event is processed using at least one of the plurality of software components, and one or more of the plurality of software components are popped from the memory stack.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary embodiments of the invention; however, the invention is not limited to the specific methods and instrumentalities disclosed. In the drawings.

DETAILED DESCRIPTION OF ILLUSTRATIVE EMBODIMENTS

Overview

The present invention is directed to an extensible method and system for processing UI events. The present invention may be implemented to process UI events using software components that may be separated from the user actions that require their use. One or more of such components may be called and pushed onto a memory stack in any configuration desired. Additional components, such as a component to monitor UI events to determine which components should be pushed onto the memory stack, may be used to control the use of such components. One or more components may be active or suspended while on the memory stack, and may be terminated by being popped from the stack.

The present invention enables customization of a UI event handling system by providing a means for maintaining accountability of components without the conventional need to monitor system states. Conventionally, such a customization requires perfect knowledge of system states to avoid errors or a program failure. The present invention provides a method that enables components to be added, deleted and/or modified without the need to monitor such system states. A method for maintaining an organizational integrity of a plurality of components by way of a memory stack is also provided.

Exemplary Computing Environment

Figure 1:
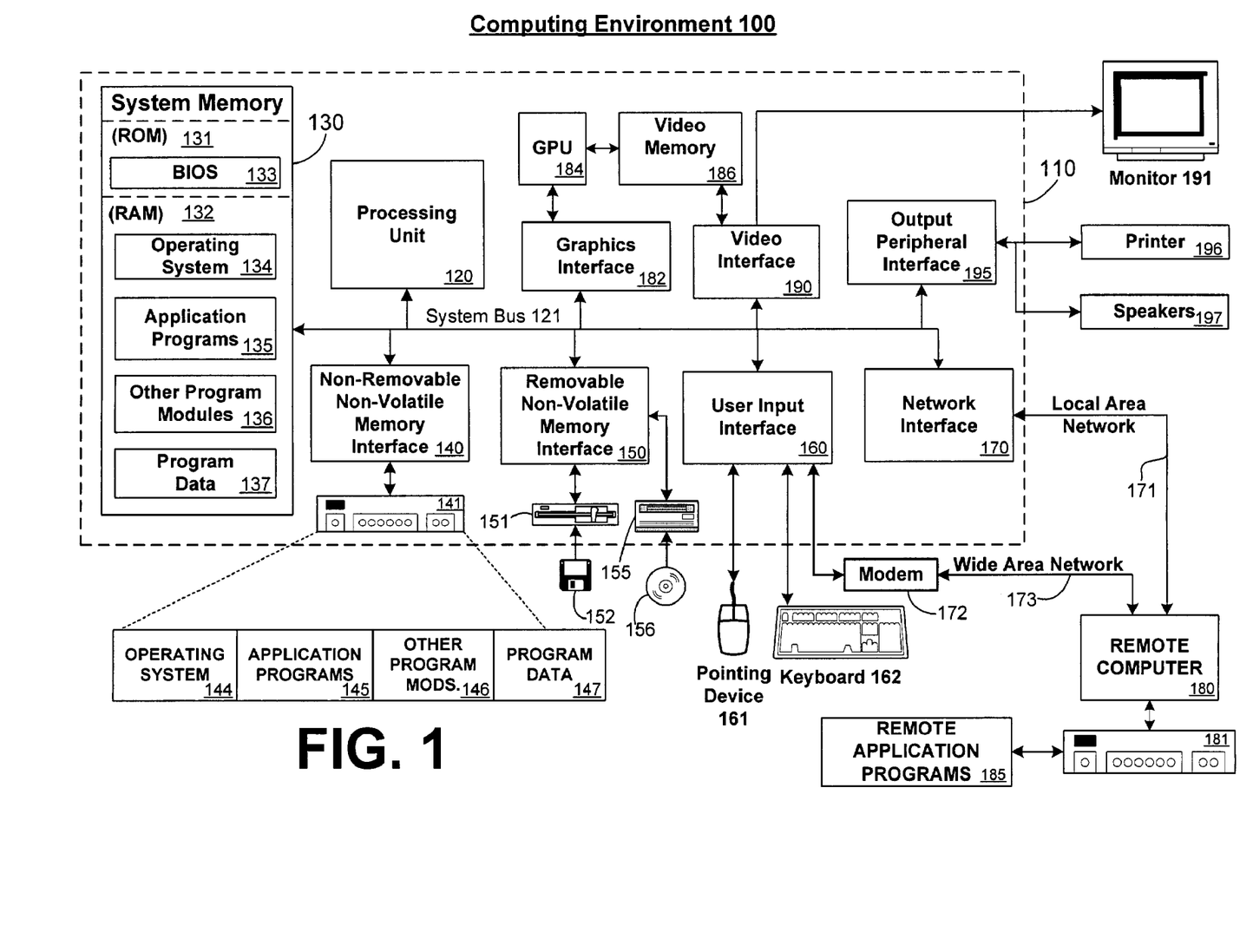
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are preformed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks Or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, API, or a "middle man" object between a coprocessor and requesting object, such that services may be performed by, supported in, or accessed via all of .NET's languages and services, and in other distributed computing frameworks as well.

Exemplary Embodiments

An embodiment relates to the handling of a UI input event in the context of a software application editing, design or operational environment. For example, while in a software application, a user may be presented with, or may select, a function to perform on an object, text or the like that is displayed on a display device. An example of such a function is the selection of a button displayed on a display device. A print button, for example, when selected by a user, may cause the application to print a document, invoke a print menu or the like. Another example of such a function is a "zoom" tool. As the name implies, a zoom tool changes the scale of an object when viewed on a display device. Different ways of invoking a zoom tool while a user is operating in an application editing mode may exist in a software application. For example, a zoom tool may perform various tasks, such as: changing a zoom level for each click of a mouse wheel while a particular key is depressed, increasing a zoom level for each mouse click while ensuring that the point of the click stays within a visible frame, or decreasing a zoom level for each mouse click while a designated key (such as, for example, the "Alt" key) is held during a mouse down and drag, thereby allowing a user to select a rectangle to be enlarged to fit in the view.

In addition, different applications may have slightly varying programming conventions as to how a particular action, such as a zoom tool, may be activated. Nevertheless, the desired effect of the tool on the edited object is generally identical. Because of the various inputs that may invoke a tool, in one embodiment the component that enables the functionality of a tool is separate from any input event that may activate and control the tool. In such a manner, therefore, the functionality of a tool may be invoked by any UI event using any programming convention. Accordingly, in an embodiment software that processes a UI event may be implemented as an "edit behavior." An edit behavior is a software component, such as for example an Application Program Interface (API) that implements a specific UI function by handling one or more UI events. An edit behavior may comprise software code only for handling a UI event, while other software or another component is responsible for determining when to cause the edit behavior to process the UI event. Optionally, an edit behavior may also contain software code for describing the set of UI events for which it may provide functionality, although such a description is not required by an embodiment. In one embodiment, an "active" edit behavior is currently capable of processing a UI event, while a "suspended" edit behavior is available but not currently processing UI events. A "terminated" edit behavior would need to be retrieved from system memory 130 or the like before such edit behavior would be available to process a UI event. Details of programming suitable edit behaviors and other software components involved in tracking and handling UI events as described herein should be known to one skilled in the art and is therefore not discussed in detail herein for clarity.

Figure 2A:
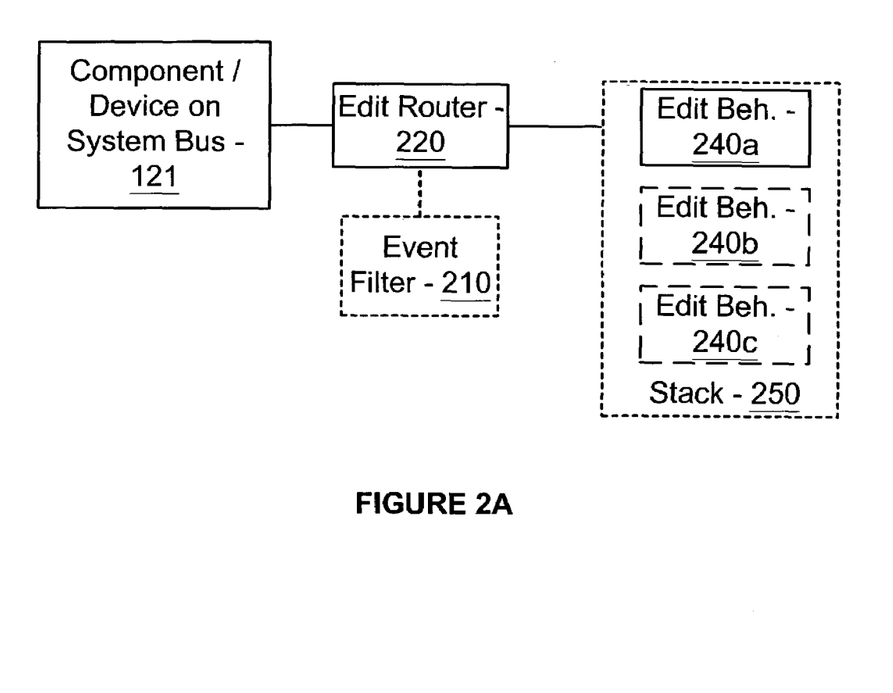
FIG. 2A is a functional diagram illustrating a relationship between computer components providing UI event handling in accordance with one embodiment of the present invention.

Turning now to FIG. 2A, a device or component of computer 110 (not shown) that is operatively connected to system bus 121 may be in operative communications with edit router 220. Edit router 220 may be a software component of a software application design environment, such as for example an API, that is capable of receiving UI events directly from user input interface 160, system bus 121, or the like, and routing such events to one or more edit behaviors 240a-c. In one embodiment, edit router 220 may be adapted to provide additional functionality to edit behavior 240, such as for example providing a uniform process for tool activation, a framework for cooperation between multiple tools or a means for customization of tool behavior. In one embodiment, edit router 220 is the only component that can initialize, suspend, resume and terminate an edit behavior 240 directly.

In one embodiment, edit router 220 has a set number of associated edit behaviors 240a-c to which edit router 220 may route a UI event for handling. In another embodiment, edit router 220 may have a variable number of edit behaviors 240 depending upon, for example, application requirements. In yet another embodiment (shown in FIG. 2B), one edit router 220 may have other edit behaviors 240a-c that together form a composite tool that has multiple active edit behaviors 240 such as, for example, tools for performing a zoom, resize and scroll function, while another edit router 220 may have edit behaviors 240 for performing other functions. As will be discussed below in connection with FIGS. 2C and 3, more complex arrangements of edit routers 220, edit behaviors 240a-c or the like are possible, thereby enabling the creation of enhanced editing functionality.

Returning to FIG. 2A, edit behaviors 240a-c may be stored in memory stack 250. While FIG. 2A illustrates three edit behaviors 240a-c, it may be appreciated that any number of edit behaviors 240 may be present. Edit behaviors 240a-c stored in stack 250 may be collectively referred to as a behavior stack. Memory stack 250 may be any location in system memory 130, non-volatile magnetic disk 152, non-volatile optical disk 156 or the like. One skilled in the art should be familiar with the operation of a memory stack 250, and therefore a detailed explanation of the operation of such a stack 250 is omitted herein for clarity. As may be appreciated, therefore, the image of memory stack 250 in FIG. 2A is a functional illustration, and any implementation of such a stack 250 is consistent with an embodiment. In addition, an application or computer 110 may have any number of stacks 250 running concurrently. As shown in FIG. 2A, and as is typical with memory stacks, only edit behavior 240a, being in the topmost position of stack 250, is active, while edit behaviors 240b-c, being in lower positions, are suspended. If edit behavior 240a is "popped," or removed, from stack 250 then edit behavior 240b may be placed in the topmost position, thereby becoming active. In one embodiment, an edit behavior 240 will pop itself from stack 250 upon completion of processing a UI event, whereas in an alternate embodiment another component, such as edit router 220 will pop the edit behavior from stack 250. As a default, in one embodiment without event filter 210, edit router 220 only routes a UI event to an edit behavior 240 that is currently active, such as edit behavior 240a.

Optional event filter 210 is operatively connected to edit router 220 and may be a software component, such as an API, that performs preliminary processing of UI events, a stand-alone program designed to handle such events or the like. In one embodiment event filter 210 is activated by and receives a UI event from edit router 220, which may occur prior to edit router 220 directing the UI event to zero or more edit behaviors 240a-c. Event filter 210 may then modify any of: the UI event, the set of edit behaviors 240 that may receive the event, and/or the state of edit router 220. In this way, event filter 210 may modify such a UI event and/or route the UI event to a proper software component, such as an edit behavior 240, for handling. For example, event filter 210 may make adjustments to the UI event to compensate for the aforementioned variances in program conventions, or the like. Event filter 210 may also analyze the UI event and only process the event if such event requires the use of an active edit behavior such as edit behavior 240a. Such an analysis may be especially applicable to an embodiment with multiple stacks 250, where one or more event filters 210 may direct a UI event to an appropriate component, such as an edit behavior 240. In addition, in such an embodiment, event filter 210 may have control over edit router 220 such as, for example, having the ability to cause edit router 220 to push or pop edit behavior 240 or one or more behavior arrays, as will be discussed in greater detail below in connection with FIG. 2B and 2C. Event filter 210 may also be able to process the UI event itself, without the need to use an edit behavior 240. In one embodiment having edit filter 210, event filter 210 always processes the event before edit router 220 passes the event to edit behavior 240a at the top of stack 250.

For example, an incoming UI event may be received by edit router 220 and provided to event filter 210. Event filter 210 may then process the event by, for example, determining the type of event and/or type of edit behavior(s) 240 that should process the event. For example, the event may be a zoom tool request, a text edit request or the like. Once the type of event is determined, event filter 210 may instruct edit router 220 to perform a task related to the event. For example, if the event is a zoom tool request, event filter 210 may instruct edit router 220 to call an appropriate edit behavior 240, such as a zoom tool edit behavior 240, to process the event. A currently active edit behavior 240 may be suspended while the zoom tool edit behavior 240 is processing the event. Upon completion of such processing, the zoom tool edit behavior 240 that processed the event, or edit router 220 or the like may pop the zoom tool edit behavior 240 from the top row of stack 250. When such a behavior 240 is popped, the edit behavior 240 that had been suspended—the next edit behavior 240 down from the top of stack 250—becomes active. The edit behavior 240 that is again active may process an indeterminate number of UI events before it is either popped from stack 250 or suspended, or it may also be popped or suspended without processing another UI event. Edit router 220 may also communicate to event filter 210 that such processing is complete. In such an embodiment, event filter 210 may then instruct edit router 220 to perform another task, if necessary. Another task may be necessary, for example, if the event requires multistage processing, an intervening event requires processing or the like. Alternatively, event filter 210 may not require edit router 220 to perform any further tasks until another UI event is detected.

Various additional components may also be added to, or may replace components in, the embodiment illustrated in FIG. 2A. For example, a possible additional or replacement component is a "selection," which may be a component responsible for accounting for the objects selected by a user, as well as for providing visual feedback of an object's selection. The feedback may be a sound, change in visual appearance of the object, or the like.

Another such additional component is a "selection router" that, in one embodiment, is a special version of edit router 220, and may be in operative communications with edit behaviors 240a-c, edit router 220, or event filter 210. A selection router may be a component, such as edit router 220 or edit behavior 240, that may be placed on stack 250. A selection router may be used to manage the editing selections available to a user based on the types of objects being edited or selected for editing. For example, different object types may require specialized code for editing, such as text, an image, a table or the like. One embodiment incorporating a selection router will be discussed below in connection with FIG. 5. Similar to edit router 220, the functionality of a tool is separate from any input event that may activate and control the tool. Accordingly, a selection router may enable flexible user selection of an object so, for example, a table cell when selected could be treated as text for commands such as Bold, or as a table for commands such as Column Width.

A situation may also arise where the desired editing process is determined by analyzing a UI event in connection with a selected object. Such a situation may arise, for example, upon clicking on an image, where the click and the selection of the object are both UI events that may be processed. In such a situation, therefore, the click on the object, as well as the object's selection, should activate an appropriate UI operation. In one embodiment, the processing of a UI event is initiated upon the selection of an object, and is performed by pushing an edit behavior 240 or the like implementing the selection onto stack 250, and processing the UI event accordingly. Multiple types of selectable objects and type-specific selection components, such as an edit behavior 240, may be managed by a selection router.

As discussed above, in one embodiment a selection router is a specialized version of edit router 220, with added functionality to the enable selection router to process a more complex UI event. For example, a selection router may have the functionality of event filter 210 built-in, which may create and/or push an edit behavior 240 onto stack 250 based on type of object being selected by a user, as would be the case with a selection event such as a mouse move or mouse click. The selection router may also route the UI event to the component appropriate for the type of object selected. A selection router may also have additional functionality to enable it to call additional edit behaviors 240 or the like as necessary. As may be appreciated, a selection router is just one possible component that may be created to process a UI event using a stack or array as disclosed herein.

Figure 2B:
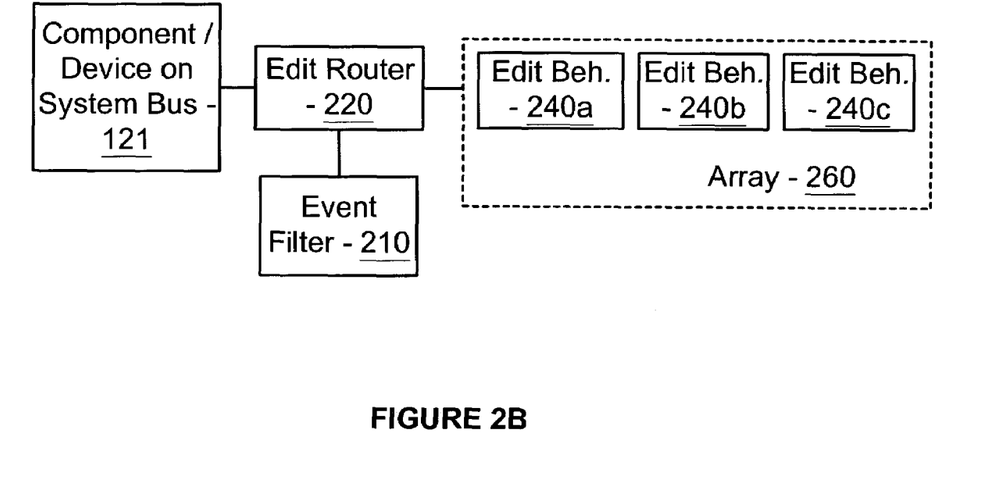
FIG. 2B is a functional diagram illustrating an array of edit routers in accordance with one embodiment of the present invention.

Returning to FIG. 2A and as discussed above, in an embodiment, only one edit behavior 240 may be "active" at a given time. In other words, only edit behavior 240a may be available to process a UI event. Alternatively, a plurality of edit behaviors 240 may be available simultaneously. A variety of factors may determine which edit behavior(s) 240 may be active, such as for example: which object is currently selected by a user, which editing mode is currently being used, default setting, a customized preference or the like. Referring now to FIG. 2B, the configuration of FIG. 2A is shown with an array 260 of edit behaviors 240a-c. In such a configuration, edit behaviors 240a-c are active simultaneously. In one embodiment, the behavior array 260 is stored in system memory 130, non-volatile magnetic disk 152, non-volatile optical disk 156 or the like, while in another embodiment the behavior array 260 may be stored in an active section—such as the top—of memory stack 250. As was discussed above in connection with FIG. 2A, event filter 210 may direct edit router 220 to pass a UI event to one of the active edit behaviors 240a-c to process the event. Alternatively, edit router 220 may pass an event to any or all of the active behaviors 240a-c present in array 260.

Figure 2C:
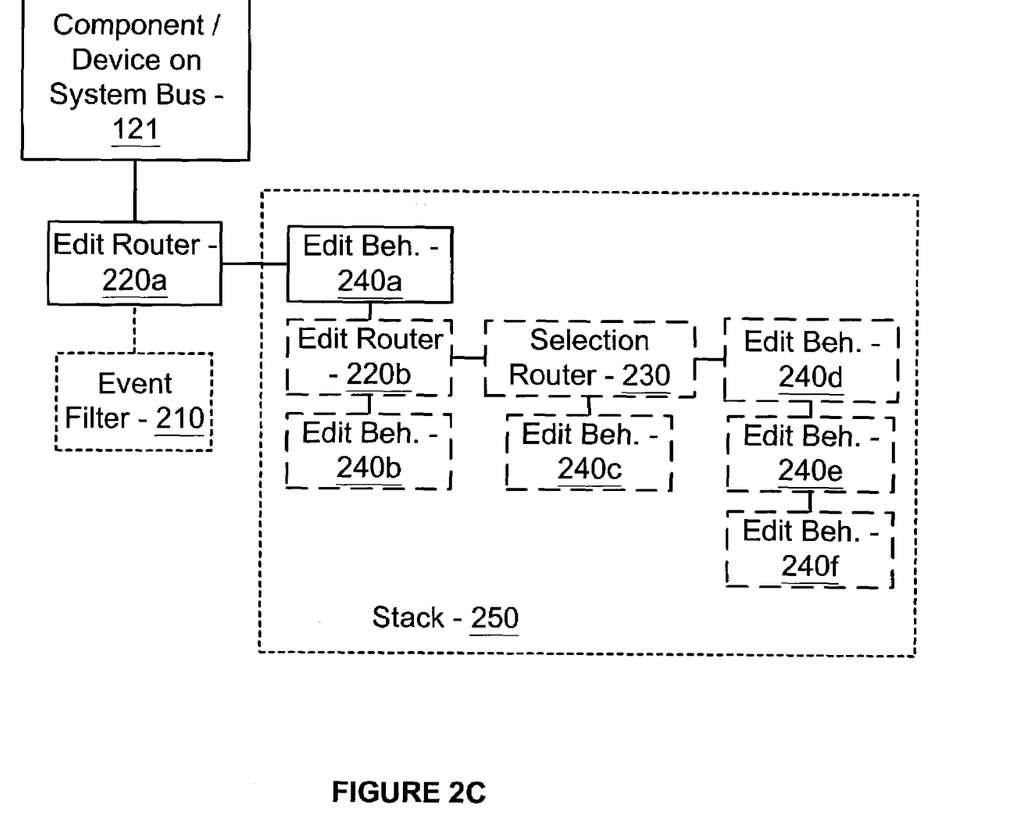
FIG. 2C is a functional diagram illustrating a nested relationship.

To permit additional flexibility in the configuration and operation of editing tools, such as for example tools that may be customized by a user, one or more edit behaviors 240 or the like may be invoked by an edit behavior 240, edit router 220 or the like, which may result in the exemplary nested arrangement illustrated in FIG. 2C. Edit router 220a is associated with edit behaviors 240a-c, where edit behavior 240a is active and edit behaviors 240b-c are suspended. Also suspended in stack 250 are selection router 230 and edit behaviors 240c-f. As noted above in connection with FIG. 2A, any arrangement of edit behaviors 240, edit routers 220, selection routers 230 or the like may be pushed onto stack 250.

In one embodiment, and as illustrated, event filter 210 may be operatively connected to edit router 220a. As discussed above in connection with FIG. 2A, event filter 210 may review, and in some embodiments change, UI events before such events are processed by an edit behavior 240, and may also affect which edit behavior 240, selection router 230 or the like may receive and process the UI event if more than one component is simultaneously active. Event filter 210 may receive a UI event from edit router 220a, and may then perform such review and processing. Event filter 210 may then instruct edit router 220a to process the event using a particular component such as active edit behavior 240a or may instruct edit router 220a to call one of the suspended components as illustrated in FIG. 2C and in a manner discussed below in FIG. 3. As also shown in FIG. 2C, edit router 220 may be pushed onto stack 250 just as any other component, such as edit behavior 240a-f. In addition, event filter 210 may instruct edit router 220a to push a component that is not currently on stack 250 onto stack 250.

Nesting edit routers 220a-c in such a manner may enable a software application, user or the like to, for example, customize an existing edit behavior 240, such as by adding an new edit behavior 240 or by changing an existing edit behavior 240 or the like. Nesting may also enable the construction of a tool having complex functionality from multiple edit behaviors 240 or the like. For example, a complex tool could be a combination of a primary tool, such as a "pen" or "brush" tool, with common help tools such as a scroll or zoom tool. In such a situation, a software application could create a user environment where, for example, a common tool is temporarily activated by pressing a designated key while a primary tool is still active, thereby obviating the need to suspend the primary tool. Nesting may further enable an application to arbitrate between multiple, similar edit behaviors 240 such as, for example, for managing selections of multiple types of objects.

Figure 3:
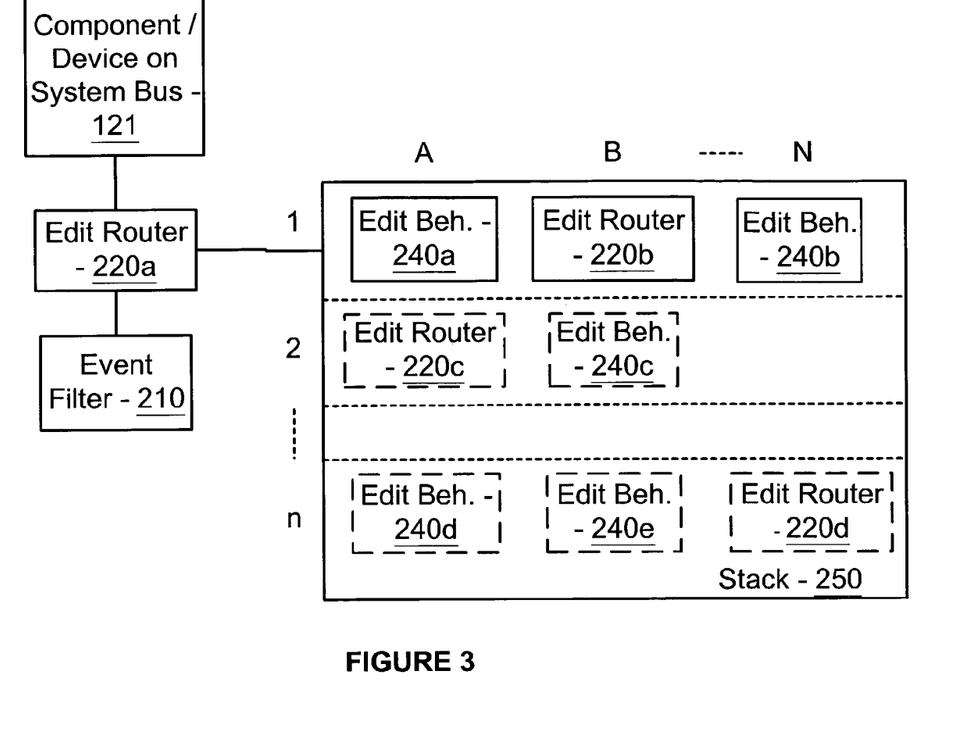
FIG. 3 is a functional diagram illustrating a memory stack in accordance with one embodiment of the present invention.

Turning now to FIG. 3, each position in stack 250 is labeled as follows: the first (top) row of entries is denoted by position 1, the second by 2, third by 3 and the last by the variable n. The variable n indicates that the number of rows of stack 250 may be of any size. The first (left) column of stack 250 is denoted by position A, the second by B and the last by the variable N. As is the case with the number of rows, stack 250 may contain any number of columns. As may be appreciated, therefore, the number of components, such as edit behaviors 240, edit routers 220 or the like, that may be pushed onto stack 250 may be unbounded. In addition, in an embodiment presented below, only components that are in row 1 may be active to receive or process UI events, while components in other rows are suspended. However, any row, column or location within stack 250 may be designated as an "active" area while still remaining consistent with an embodiment. Horizontal lines in stack 250 indicate a division between rows 1-n. A behavior array 260 may be present within each row, as shown in FIG. 3.

As discussed above, memory stack 250 may be in operative communications with edit router 220a. Edit router 220a may in turn be operatively connected to the components located in stack 250. In one embodiment, any component on stack 250, such as edit behaviors 240a-b and edit router 220b, that is in row 1 is active and available to process a UI event. Other components, such as edit routers 220c-d and edit behaviors 240c-e, that are not in row 1 are suspended. In an embodiment, no events are routed to components in a suspended row, and no component will change the set of components in a suspended row. In such an embodiment, and as discussed above in connection with FIG. 2A, suspended components are only active when either the components above them in stack 250 are popped from stack 250, or when such suspended components are pushed to the top of stack 250.

In one embodiment, one or more components, such as edit behaviors 240a-b, and edit router 220b, are pushed onto stack 250 in the same row, such as row 1. However, and as discussed above, any convention of pushing a component onto stack 250 is consistent with an embodiment. Edit router 220a may push such components onto stack 250 when instructed to do so by event filter 210, in response to a UI event or the like. As in FIGS. 2A-C, edit router 220a may be operatively connected to a component or device on system bus 121. As may be appreciated, any number of components may be pushed onto stack 250 in any configuration. For example, edit router 220a may push only a single component, or several rows of a single component, onto stack 250. In addition, edit router 220a may push all components, such as edit behaviors 240a-e and edit routers 220b-d, onto stack 250 at one time.

Components may be pushed onto stack 250 in response to a UI event, or prior to such event. To process the event, edit router 220a may pass the event to an active component in row 1, either with or without the direction of event filter 210. Alternatively, edit router 220a may push one or more components in a suspended row into row 1 to activate the components. For example, edit router 220a may push edit routers 220d and edit behaviors 240d-e from row n to row 1. A component such as edit behavior 240a, for example, may be activated by edit router 220a with a push operation, whereby edit behavior 240a is placed into row 1 of stack 250. As shown in FIG. 3, edit behaviors 240a-b and edit router 220b are active in row 1, while edit behaviors 240c-e are suspended in rows 2-n. Edit router 220c and edit behavior 240c may be pushed onto stack 250, row 1, by edit routers 220a-b, edit behaviors 240a-b, at the direction of event filter 210 or the like. Likewise, edit behaviors 240d-e and edit router 220d, that are shown in row n, may be pushed onto row 1 of stack 250 by any of edit routers 220a-b, edit behaviors 240a-b, at the direction of event filter 210 or the like. As may be appreciated, any combination and number of components may be pushed onto stack 250. In fact, a stack 250, such as a stack 250 associated with any of edit routers 220b-d, may also pushed onto, popped from and suspended on stack 250.

As may also be appreciated, the use of stack 250 to maintain control of components such as edit behavior 240, enable one or more edit behaviors 240 or the like to be added, deleted or modified without interfering with the overall operation of UI event processing. For example, a programmer or specialized user desiring to change the functionality of an edit behavior 240, such as edit behavior 240a, would need only modify such edit behavior 240a. When such modified edit behavior 240a processes a UI event, the modified functionality will process the event without causing an improper state or the like. Accordingly, the use or monitoring of states is not necessary to incorporate such modified edit behavior 240a.

As an illustrative example of the use of stack 250, in one embodiment edit router 220a may push edit behaviors 240a-b and edit router 220b onto stack 250 in response to a UI event, a direction from event filter 210 as in an embodiment discussed above in connection with FIGS. 2A-C, or the like. Edit behaviors 240a-b and edit router 220b, being in row 1, are active and may process a UI event. In the event that, for example, event filter 210 or the like determines that any of edit behaviors 240a-b and edit router 220b are no longer needed to process a UI event, any of edit behaviors 240a-b and edit router 220b may either be suspended or terminated. If suspended, the components may be pushed "down" a row to row 2, and another component, or array 260 of components, may be pushed into row 1, thereby becoming an active component. Edit behaviors 240a-b and edit router 220b may be pushed further down stack 250 if additional components are pushed to the top of the stack 250. If terminated, edit behaviors 240a-b and edit router 220b are, in one embodiment, popped from stack 250, either at their own direction, such as by giving edit router 220a pop command, or at the direction of another component, such as event filter 210 or edit router 220a.

In one embodiment, a component in row 1, or edit router 220a or the like, may push one or more components onto stack 250. For example, active edit behavior 240a may be configured to require additional functionality that may be provided by edit router 220c and its associated edit behavior 240c. Accordingly, edit behavior 240a pushes edit router 220c and edit behavior 240c onto stack 250. Edit router 220c, now in row 1, is active along with edit behavior 240c, which therefore may also process a UI event. Alternatively, and as in an embodiment discussed above in connection with FIGS. 2A and 2B, event filter 210 may instruct edit router 220a to push any of edit routers 220b-d and/or edit behaviors 240a-e onto stack 250 at any point during processing of a UI event. Likewise, event filter 210 may instruct edit router 220a, or any component, to pop any of edit routers 220b-d and/or edit behaviors 240a-e off stack 250. As may be appreciated, such a configuration permits multiple levels of processing for a UI input event.

Figure 4:
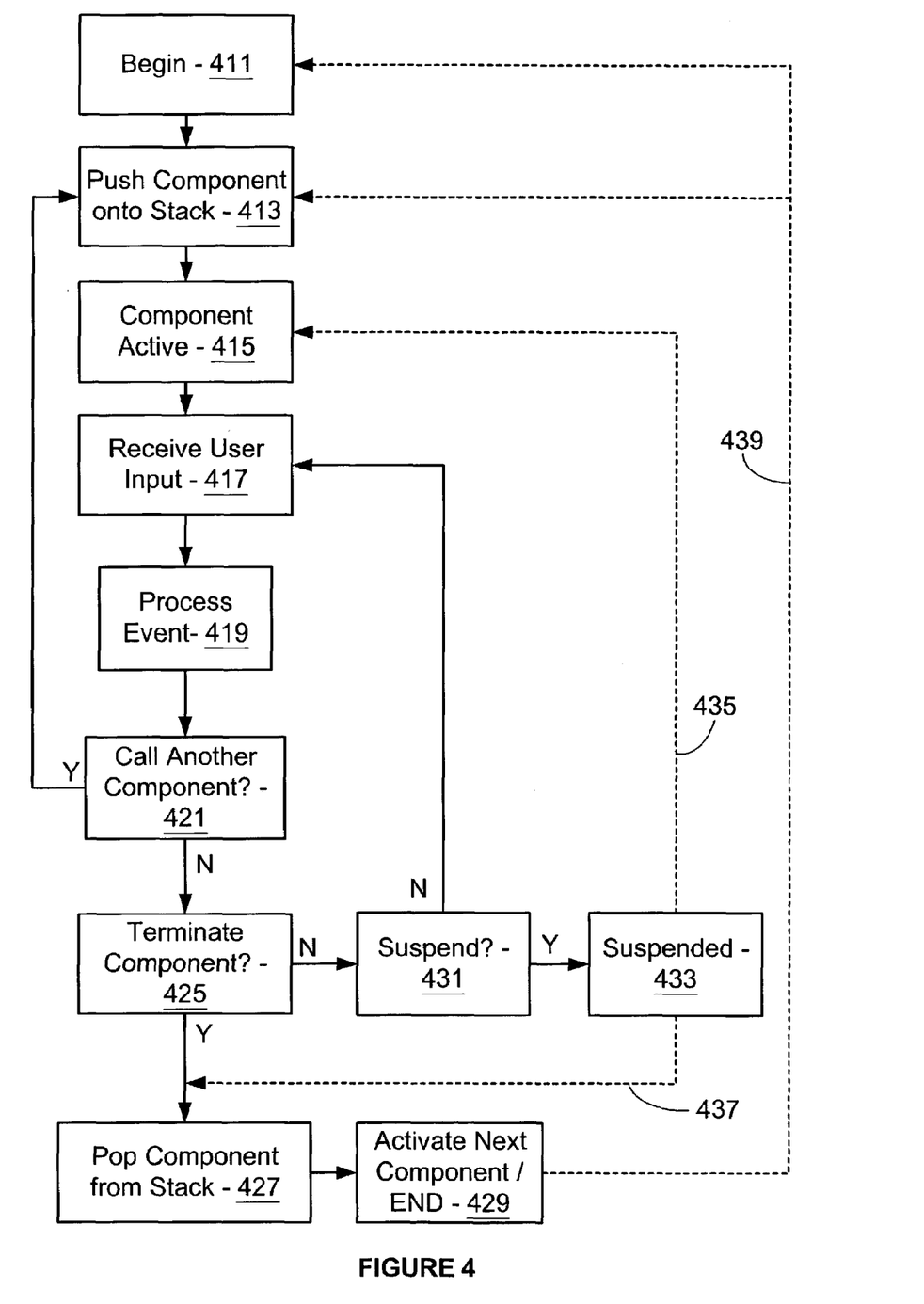
FIG. 4 is a flowchart illustrating a method of handling a UI event in accordance with one embodiment of the present invention.

A method by which a computer 100 or the like may handle a UI event is illustrated with reference to FIG. 4. At step 411, the method begins. As discussed above, any component may begin the method. Step 411 may take place at the very beginning of editing, or may take place after previous UI events have been handled by components such as edit behavior 240 or the like. At step 413, at least one component, such as edit behavior 240, edit router 220, selection router 230 or the like is pushed onto stack 250. Step 413 may take place in response to event filter 210 instructing edit router 220 to push such component onto stack 250, solely in response to edit router 220, or as will be discussed below in connection with step 421, from another component. As was discussed above in connection with FIG. 3, at least one of the components that are pushed onto stack 250 may be located in an active area, such as row 1. As may be appreciated, therefore, if any component, such as edit behavior 240, edit router 220 or the like, is already on the stack, such component may be popped from the stack, in which case the component has been terminated, or may be shifted down a row, in which case the component has been suspended.

At step 415, at least one component becomes active and awaits a UI event to process according to the functionality the component provides. An internal process may occur to activate a component on stack 250 to enable such component to process a UI event, or the component may be active upon being pushed onto an active area of stack 250. For example, if several edit behaviors 240 are pushed onto stack 250, then an internal method may be called on to perform an initialization of such edit behaviors 240.

At step 417, a UI event is received. As noted above, the UI event may be received by the component on stack 250 by way of edit router 220 as directed by event filter 210, directly from edit router 220, or the like. At step 419, the UI event is processed according to the functionality of the edit behavior 240. As part of such functionality, and as will be discussed in connection with steps 421 and 423, event filter 210, selection router 230, edit router 220, edit behavior 240 or the like may call additional components and push such components onto stack 250. The component may also, as part of processing the UI event, output a result or change to output peripheral interface 195, network interface 170, video interface 190 or the like. At step 421, if one or more additional components are needed to process the UI event, then the method will proceed to step 413 for the called components. The processing of the called component may take place concurrently with the processing of the calling component, consecutively or in any manner desired. As will be discussed below, the calling component may be terminated or suspended upon calling an additional component.

At step 425, the component may be terminated if its functionality is no longer needed. If such is the case, the method proceeds to step 427. If the component is not to be terminated, then the method proceeds to step 431, where a suspend determination is made. If the component is suspended, it enters a suspend state at step 433. A suspend or terminate determination may be made in response to a particular UI event, such as for example a mouse button up, depressing of a particular key or the like. Alternatively, an external operation such as, for example, a tool change or the like may initiate such a determination.

As discussed above in connection with FIG. 3, such a suspend state may occur when the component is shifted down one or more rows in stack 250. The component may reside in a suspended state until such component is re-activated—such as for example by being pushed back to row 1 of stack 250 in FIG. 3—or terminated at step 427. At step 427, the component is terminated by being popped from stack 250. The component may terminate itself by popping itself from stack 250, or such termination may be initiated by edit router 220, selection router 230, event filter 210 or the like.

At step 429, the process may end, if no further edit operations are to take place, or a next component may become active if the process is to continue. For example, if the currently running component is to terminate, but another component is to become active, then the currently running component may be popped from stack 250 at step 427, and then at step 429 the process may, as indicated by line 435, return to steps 411 or 413. As may be appreciated, the design of event filter 210, edit router 220, selection router 230, edit behavior 240 or the like may change the exact timing, sequence, number of steps and the like of the method described herein in connection with FIG. 4. For example, a component may process a UI event and then may be terminated at steps 425, 427 without proceeding to steps 421, 431 or 433.

Figure 5:
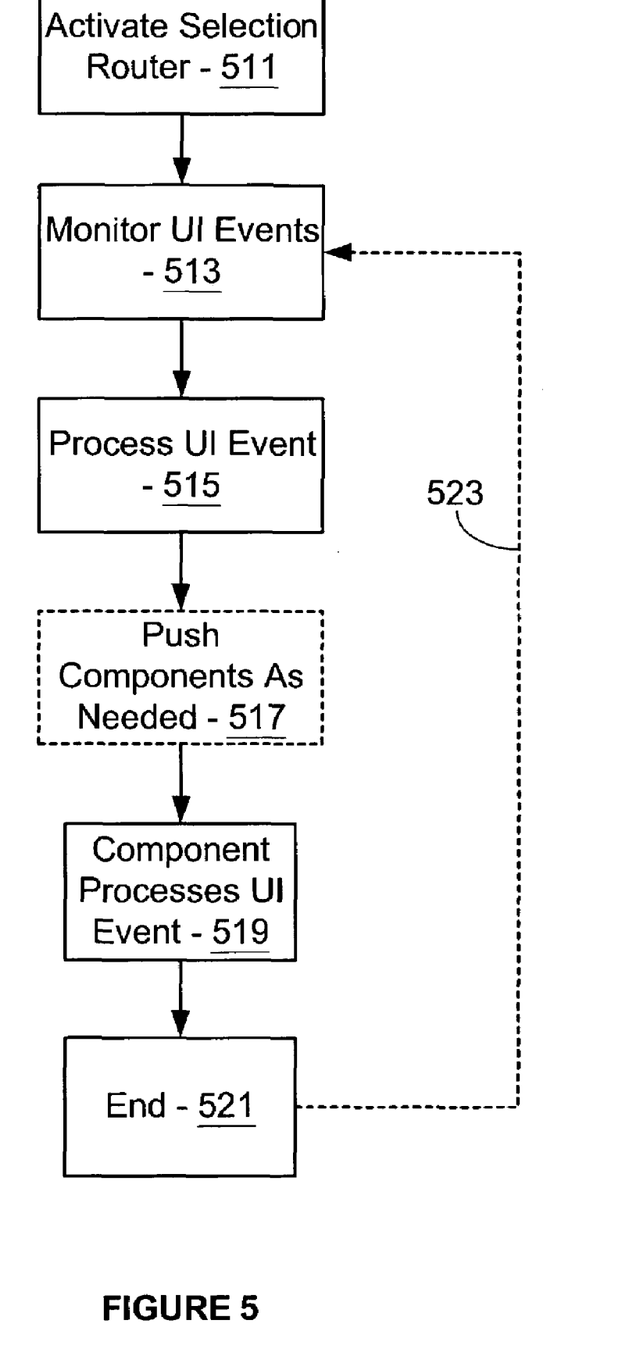
FIG. 5 is a flowchart illustrating a method of monitoring and handling a UI selection event in accordance with one embodiment of the present invention.

As discussed above in connection with FIGS. 2A and 2B, many types of components are available according to an embodiment. One such component is selection router 230, which may be a specialized edit router 220 as discussed above in connection with FIG. 2A. Turning now to FIG. 5, selection router 230 is activated at step 511. Step 511 may take place, for example, when event filter 210 instructs edit router 220 to push selection router 230 onto stack 250, or selection router 230 may incorporate the functionality of event filter 210, and cause itself to be pushed onto stack 250. If selection router 230 is pushed onto stack 250, it may be placed in an active area of stack 250, such as row 1 of the stack 250 illustrated in FIG. 3. At step 513, selection router 230 monitors for UI events that may activate a selection process such as, for example, a mouse move, mouse down, keyboard focus change or the like. During step 513, selection router 230 may optionally have one or more edit routers 220 and/or edit behaviors 240 active or suspended on stack 250. For example, an edit router 220 having edit behaviors 240 that are most applicable to the likely UI events that may be monitored by selection router 230 may be in place on stack 250 to enable a faster or more comprehensive response. In fact, one or more edit routers 220 and/or edit behaviors 240 may even be pushed onto stack 250 before or at the same time selection router 230 is activated at step 511.

At step 515, selection router 230 processes one or more UI events. In doing so, selection router 230 may optionally work in conjunction with event filter 210. In fact, and as discussed above in connection with FIG. 2A, selection router 230 may incorporate the functionality of event filter 210, so that selection router 230 may perform the tasks normally associated with event filter 210, without having event filter 210 as a separate component. As mentioned above in connection with step 513, selection router 230 may have one or more edit routers 220 and/or edit behaviors 240 or the like active on stack 250 during steps 513 and 515. If this is the case, selection router 230 may pass the UI event to an active edit router 220, edit behavior 240 or the like for processing at step 519. If no edit router 220, edit behavior 240 or the like is active during step 515, or if a desired component is not active or present, then selection router 230 may proceed to optional step 517 to push the desired components on to stack 250. As may be appreciated, a component may be chosen by selection router 230 to process a UI event according to any criteria, such as for example event kind, presenter type, potential element type, current state (such as in-place active) or the like. Also, selection router 230 may push a component onto stack 250 itself, or may instruct another component, such as edit router 220, to do so.

At step 519, the appropriate component(s) such as edit router 220, selection router 230, edit behavior 240 or the like processes the UI event as discussed above in connection with FIG. 4, step 419. After processing the UI event, the process may end at step 521. However, and as may be appreciated, such process may be ongoing, in which case selection router 230 may continue to monitor UI events at step 513, as indicated by optional arrow 523. If the process is to be terminated or suspended, such termination or suspension may take place as discussed above in connection with FIGS. 3 and 4.

As may be appreciated from the preceding discussion, having selection router 230 be responsible for UI selection bookkeeping and edit routers 220 and edit behaviors 240 for handling UI input events, enables one to extend each independently. Therefore, updating or customization of an individual feature such as, for example, a zoom tool as carried out by edit behavior 240, may be updated without interfering with the criteria for selecting such tool because the corresponding selection router 230 or edit router 220 will remain unaffected. Accordingly, and as discussed above in connection with FIG. 3, changes of any size, even as minor as a single change to an individual component, may be made without the necessity of maintaining perfect accountability of states.

While the present invention has been described in connection with the preferred embodiments of the various figures, it is to be understood that other similar embodiments may be used or modifications and additions may be made to the described embodiment for performing the same function of the present invention without deviating therefrom. For example, one skilled in the art will recognize that the present invention as described in the present application may apply to any configuration of components in any type of application environment. Therefore, the present invention should not be limited to any single embodiment, but rather should be construed in breadth and scope in accordance with the appended claims.

What is claimed:

1. A method for processing a user interface event by using a memory stack configured for adding, deleting, or modifying software components thereby eliminating the need to monitor system states associated with a software application within which the user interface event has been evoked, the method comprising:

designating a first portion of the memory stack as an active area for storing active software components;

designating a second portion of the memory stack as an additional area for storing suspended software components;

receiving the user interface event by way of a user interface;

sending the user interface event to a software component stored in the active area of the memory stack; and processing the user interface event using the software component, the processing being carried out independent of the system states associated with the software application.

2. The method of claim 1, wherein the active area is a column in the memory stack.

3. The method of claim 1, wherein the active area is the top of the memory stack, and wherein the processing takes place only if the software component is located at the top of the stack.

4. The method of claim 1, wherein the active area is an area other than the top of the memory stack.

5. The method of claim 3, wherein the software component is a first software component, and wherein processing the user interface event comprises:

determining whether to push a second software component onto the memory stack to process the user interface event and, if so, pushing the second software component onto the top of the stack;

determining whether to process the user interface event using the first software component and, if so, processing the user interface event using the first software component; and determining whether to pop the first software component from the stack and, if so, popping the first software component from the stack.

6. The method of claim 1, further comprising suspending the software component by moving the software component from the active area to the additional area of the memory stack.

7. The method of claim 1, wherein the software component is one of an edit router and an edit behavior.

8. The method of claim 1, wherein the software component comprises a nested configuration.

9. The method of claim 8, wherein a portion of the software component is temporarily activated.

10. The method of claim 1, further comprising:

pushing a plurality of software components onto the memory stack;

selecting at least one of the plurality of software components to process the user interface event;

processing the user interface event using said at least one of the plurality of software components; and popping said one or more of the plurality of software components from the memory stack.

11. The method of claim 1, further comprising:

selecting, according to the software component, one or more additional software components;

pushing the one or more additional software components onto the memory stack;

processing, using any of the one or more additional software components, the user interface event.

12. The method of claim 1, further comprising outputting a result of said processing of said user interface event to an output device.

13. The method of claim 1, wherein the software component is a first software component, and wherein processing the user interface event comprises:

pushing a second software component adapted to process said user interface event onto the memory stack;

processing the user interface event using the second software component; and popping the second software component from the memory stack.

14. The method of claim 13, further comprising suspending the first software component upon pushing the second software component onto the memory stack.

15. The method of claim 14, further comprising re-activating the first software component upon popping the second software component from the memory stack.

16. The method of claim 14, wherein suspending the first software component comprises:

pushing the second component to the active area of the memory stack; and suspending the first software component by shifting the first software component to the additional area of the memory stack.

17. The method of claim 1, wherein the user interface event is an editing command initiated in an editing mode of a software application.

18. The method of claim 1, wherein the user interface event is a selection of an object in a software application.

19. The method of claim 18, wherein the software component is a selection router, and wherein the method further comprises:

determining, using the selection router, whether to process the user interface event and, if so, processing the user interface event; and determining whether to process the user interface event using a second software component and, if so;

determining whether the second software component is on the memory stack and, if not, pushing the second software component onto the memory stack; and processing the user interface event using the second software component.

20. The method of claim 1, wherein the user interface event is received by a first software component and processing the user interface event comprises using at least one of a second software component and a third software component.

21. The method of claim 20, wherein the first software component is an edit router, the second software component is an event filter, and the third software component is an edit behavior.

22. The method of claim 20, further comprising determining, using the second software component, whether to process the user interface event and, if so, processing the user interface event; and determining whether to process the user interface event using the third software component and, if so;

determining whether the third software component is on the memory stack and causing the second software component to push the third software component onto the memory stack only if the third software component is not on the memory stack; and processing the user interface event using the third software component.

23. The method of claim 22, wherein both the second software component and third software component process the user interface event.

24. The method of claim 22, wherein the first software component pushes the second software component into the active area of the memory stack from the additional area of the memory stack.

25. The method of claim 22, wherein the first software component pushes the second software component into the active region of the memory stack from a memory device.

26. A computer-readable storage medium having stored thereon computer-executable instructions for performing a method of processing a user interface event, the method comprising:

receiving a user interface event by way of a user interface;

sending the user interface event to a software component stored in an active area of a memory stack, the memory stack containing an additional area wherein are stored suspended software components; and processing the user interface event using the software component.

27. The computer-readable storage medium of claim 26, wherein the active area comprises one of a) a row, b) a column, and c) a location of the memory stack.

28. The computer-readable storage medium of claim 26, wherein the active area is the top of the memory stack, and wherein the processing takes place only if the software component is located at the top of the stack.

29. The computer-readable storage medium of claim 26, wherein the active area is an area other than the top of the memory stack.

30. The computer-readable storage medium of claim 28, wherein the software component is a first software component, and wherein processing the user interface event comprises:

determining whether to push a second software component onto the memory stack to process the user interface event and, if so, pushing the second software component onto the top of the stack;

determining whether to process the user interface event using the first software component and, if so, processing the user interface event using the first software component; and determining whether to pop the first software component from the stack and, if so, popping the first software component from the stack.

31. The computer-readable storage medium of claim 26, wherein the software component comprises a nested configuration.

32. The computer-readable storage medium of claim 26, wherein the software component is one of an edit router and an edit behavior.

33. The computer-readable storage medium of claim 31, wherein the method further comprises suspending the software component by moving the software component from the active area to the additional area of the memory stack.

34. The computer-readable storage medium of claim 26, wherein a portion of the software component is temporarily activated.

35. The computer-readable storage medium of claim 26, wherein the method further comprises:

pushing a plurality of software components onto the memory stack;

selecting at least one of the plurality of software components to process the user interface event;

processing the user interface event using said at least one of the plurality of software components; and popping said one or more of the plurality of software components from the memory stack.

36. The computer-readable storage medium of claim 26, wherein the method further comprises:

selecting, according to the software component, one or more additional software components;

pushing the one or more additional software components onto the memory stack;

processing, using any of the one or more additional software components, the user interface event.

37. The computer-readable storage medium of claim 26, wherein the method further comprises outputting a result of said processing of said user interface event to an output device.

38. The computer-readable storage medium of claim 26, wherein the software component is a first software component, and wherein processing the user interface event comprises:

pushing a second software component adapted to process said user interface event onto the memory stack;

processing the user interface event using the second software component; and popping the second software component from the memory stack.

39. The computer-readable storage medium of claim 38, wherein the method further comprises suspending the first software component upon pushing the second software component onto the memory stack.

40. The computer-readable storage medium of claim 39, wherein the method further comprises re-activating the first software component upon popping the second software component from the memory stack.

41. The computer-readable storage medium of claim 40, wherein suspending the first software component comprises:
   pushing the second component to the active area of the memory stack; and
   suspending the first software component by shifting the first software component to the additional area of the memory stack.

42. The computer-readable storage medium of claim 26, wherein the user interface event is an editing command initiated in an editing mode of a software application.

43. The computer-readable storage medium of claim 26, wherein the user interface event is a selection of an object in a software application.

44. The computer-readable storage medium of claim 43, wherein the software component is a selection router, and wherein the method further comprises:
   determining, using the selection router, whether to process the user interface event and, if so, processing the user interface event; and
   determining whether to process the user interface event using a second software component and, if so;
   determining whether the second software component is on the memory stack and, if not, pushing the second software component onto the memory stack; and
   processing the user interface event using the second software component.

45. The computer-readable storage medium of claim 26, wherein the user interface event is received by a first software component and processing the user interface event comprises using at least one of a second software component and a third software component.

46. The computer-readable storage medium of claim 45, wherein the first software component is an edit router, the second software component is an event filter, and the third software component is an edit behavior.

47. The computer-readable storage medium of claim 45, wherein the method further comprises
   determining, using the second software component, whether to process the user interface event and, if so, processing the user interface event; and
   determining whether to process the user interface event using the third software component and, if so;
   determining whether the third software component is on the memory stack and causing the second software component to push the third software component onto the memory stack only if the third software component is not on the memory stack; and
   processing the user interface event using the third software component.

48. The computer-readable storage medium of claim 47, wherein both the second software component and third software component process the user interface event.

49. The computer-readable storage medium of claim 47, wherein the first software component pushes the second software component into the active region of the memory stack from a suspended region of the memory stack.

50. The computer-readable storage medium of claim 47, wherein the first software component pushes the second software component into the active region of the memory stack from a memory device.

51. A system for processing a user interface event, comprising:
   a user interface, wherein said user interface is configured for receiving an input event from a user;
   a first software component, wherein the first software component is adapted to process the input event from said user interface;
   a memory stack comprising an active area and an additional area wherein are stored suspended software components, the memory stack adapted to receive a second software component; and
   a processor operatively connected to the user interface and the memory stack, and adapted to push the second software component onto the active area of the memory stack, send the input event to the second software component under direction of the first software component, execute the software component to process the input, and pop the second software component from the memory stack.

52. The system of claim 51, further comprising:
   a plurality of associated software components; and
   wherein said processor is further adapted to push the plurality of associated software components onto the memory stack, select at least one of the associated software components, execute the at least one of the associated software components to process the input event, and pop the at least one of the associated software components from the memory stack.

53. The system of claim 52, wherein said plurality of associated software components are associated based on an editing function performed by said plurality of components.

54. The system of claim 51, wherein said first software component is adapted to identify the second software component, and said processor is further adapted to push, in response to the identification, the second software component onto the memory stack, execute the second software component to process the input event, and pop the second software component from the memory stack.

55. The system of claim 51, wherein said memory stack is adapted to permit said processor to execute said second software component only if said second software component is in the active region.

56. The system of claim 51, wherein the memory stack is a first memory stack, and wherein the first memory stack is further adapted to receive a second memory stack.

* * * * *